United States Patent [19]

Joshi

[11] Patent Number: 5,317,566
[45] Date of Patent: May 31, 1994

[54] LEAST COST ROUTE SELECTION IN DISTRIBUTED DIGITAL COMMUNICATION NETWORKS

[75] Inventor: Ramchandra Joshi, Montville, N.J.

[73] Assignee: Ascom Timeplex Trading AG, Bern, Switzerland

[21] Appl. No.: 107,869

[22] Filed: Aug. 18, 1993

[51] Int. Cl.⁵ .......................... H04Q 11/04; H04J 3/24
[52] U.S. Cl. ..................................... 370/60; 370/94.1
[58] Field of Search .................... 370/13, 16, 54, 60, 370/94.1, 94.3; 340/826, 827; 379/221; 364/200; 395/200

[56] References Cited

U.S. PATENT DOCUMENTS

| | | | |
|---|---|---|---|
| 4,831,649 | 5/1989 | Mejane | 379/111 |
| 4,991,204 | 2/1991 | Yamamoto et al. | 379/221 |
| 5,031,093 | 7/1991 | Hasegawa | 364/200 |
| 5,068,892 | 10/1991 | Livanos | 379/221 |
| 5,105,424 | 4/1992 | Flaig et al. | 370/94.1 |
| 5,115,495 | 5/1992 | Tsuchiya et al. | 395/200 |
| 5,128,926 | 7/1992 | Perlman et al. | 370/54 |
| 5,142,531 | 8/1992 | Kirby | 370/94.3 |
| 5,166,927 | 11/1992 | Iida et al. | 370/60 |
| 5,216,591 | 6/1993 | Nemirovsky et al. | 370/16 |

OTHER PUBLICATIONS

Article Entitled "Control Architecture for Next-Generation Communication Networks Based on Distributed Databases" by Koso Mukakami and Masafumi Katoh, IEEE Journal On Selected Areas in Communications, vol. 7, No. 3, Apr., 1989.

Primary Examiner—Benedict V. Safourek
Assistant Examiner—Ajit Patel
Attorney, Agent, or Firm—Irwin Ostroff; Robert Ardis

[57] ABSTRACT

A distributed digital communications network has an originating node and a multiplicity of destination nodes. The various nodes are interconnected by links and at least some of the nodes are accessible to other nodes only by multiple links. To save time in establishing the least cost path from an originating node to a destination node, the attributes of the various links are stored in memory at the originating node, a least cost path from the originating node to a destination node is calculated in response to a connection request and stored in memory. Then, when a subsequent connection request to any destination node requires the same link attributes as the least cost path already stored in memory, that same least cost path is used if it is still operational. Significant time saving is achieved in that no new least cost calculation need be made.

14 Claims, 7 Drawing Sheets

LEAST COST ROUTE SELECTION IN DISTRIBUTED DIGITAL COMMUNICATION NETWORKS

FIELD OF THE INVENTION

This invention relates generally to distributed digital communication networks and, more particularly, to methods for selecting a route from originating nodes to destination nodes in such networks.

BACKGROUND OF THE INVENTION

A distributed digital communication network typically includes a multiplicity of nodes interconnected by transmission links. At least some nodes are typically accessible to at least some other nodes only by multiple links. In addition, at least some links typically not only have different transmission characteristics, particularly in the sense of transmission bandwidth, transmission delay, bit error rate, and the availability or unavailability of encryption but also have different transmission costs.

In transmitting a message between two nodes in such a distributed digital transmission network, it is normally advantageous to select the route entailing the lowest transmission costs before setting it up. In the past, an algorithm called the Dijkstra Shortest Path First (SPF) algorithm has been widely used for such selections. The SPF algorithm is disclosed, for example, at pages 586 through 589 of the second edition of "Data Structures Using Pascal," by Aaron Tennenbaum and Moshe Augenstein, which was published in 1986 by Prentice-Hall. Specifically, the SPF algorithm includes two separate and distinct steps. In the first step, the transmission distance between an originating node and each other node in the network is calculated. The shortest transmission distance to each potential destination node is saved in the originating node's memory. When a route is needed for transmitting a message to a particular destination node, the second step of the SPF algorithm determines a route with shortest transmission distance to the source node by tracing backwards from the destination node. Unfortunately, the selected route will not necessarily meet all transmission requirements of the message for which the route is being set up. If the selected route fails to meet all transmission requirements of the message, an entirely new calculation is necessary and establishment of a working route will be delayed. Because transmission distance may not be the only factor affecting cost, the selected route may also not really be the least cost route.

SUMMARY OF THE INVENTION

The present invention enhances both the speed and the reliability of the route selection process in a multiple node distributed digital communications network, a least in part through realization that the transmission requirements between any specific pair of nodes tend to remain the same from one connection request to the next. In such a network, the various nodes are interconnected by transmission links and at least some nodes are accessible to at least some other nodes only by multiple links.

From one important aspect, the invention is directed to a method for selecting a least cost route from an originating node to a designated destination node. Broadly, the method includes the steps of (1) receiving in a processor serving the originating node a service request including first transmission requirements for a route from the originating node to the designated destination node, (2) storing the first transmission requirements in a memory serving the originating node, (3) calculating in the processor and storing in the memory the least cost route from the originating node to the designated destination node in which each link satisfies the first transmission requirements, (4) establishing the stored route from the originating node to the designated destination node, (5) receiving in the processor a second service request including second transmission requirements for a route from the originating node to the designated destination node, (6) comparing in the processor the second transmission requirements with the first transmission requirements stored in the memory, (7) if the second transmission requirements match the first transmission requirements, validating the stored route to determine that it is still functional, and (8) establishing the stored route from the originating node to the designated destination node. Between the same pair of nodes in a distributed digital communication system, transmission requirements tend to be the same from one connection request to the next. For this reason, the invention provides route selection that not only is considerably faster than that afforded through the prior art SPF algorithm but also is more reliable in that the path selected is always in fact the least cost route.

In specific embodiments of the invention, transmission requirements for individual routes may include such factors as transmission bandwidth, transmission delay, bit error rate, and the presence or absence of an encryption and decryption capability. In various embodiments of the invention, least cost calculations are based upon the cost of using specific transmission links. Link cost is calculated, taking into account the link bandwidth already allocated for transmission and the total bandwidth capacity of the link. The cost of a route is determined by adding the costs of all links that are contained within such a route.

Because the topology of a multiple node distributed digital communications network may change, the invention, from an additional aspect, may include the further steps of (1) recalculating in the processor (advantageously as a background operation) a least cost route from the originating node to each of the destination nodes in which each link satisfies the first connection requirements, (2) replacing routes stored in the memory with the recalculated routes, and (3) if the second connection requirements match the first connection requirements, establishing the recalculated stored least cost route from the originating node to the designated destination node.

The invention, furthermore, is not limited to calculation of a single least cost route between any two nodes. Alternate routes may be calculated as well. From this aspect, the invention takes the form of a method for selecting a least cost route from an originating node to a designated destination node which includes the steps of (1) receiving in the processor a connection request including first transmission requirements for a route from the originating node to the designated destination node, (2) storing the first digital transmission requirements in the memory, (3) calculating in the processor and storing in the memory a least cost route as a primary route from the originating node to the designated destination node in which each link in the primary route satisfies the first transmission requirements, (4) calculating in the processor and storing in the memory a route from the originating node to the designated destination node in which each link in the alternate route satisfies the first transmission requirements, where the cost of the alternate route is no less than the cost of the primary route, (5) selecting the stored primary route from the memory and establishing it from the originating node to the designated destination node, (6) receiving in the processor a second service request including second transmission requirements for a route from the originating node to the destination node, (7) comparing in the processor the second transmission requirements with the first transmission requirements stored in the memory, (8) if the second transmission cost requirements match the first transmission requirements, validating the stored primary route to determine that it is still functional, (9) if the stored primary route is not functional, validating the stored alternate route to determine that it is functional, and (10) establishing the stored alternate route from the originating node to the designated destination node. The cost of the alternate route is, from this aspect of the invention, equal to or greater than the cost of the primary route.

The invention is particularly advantageous in that it gains speed over the prior art SPF algorithm by completely eliminating anything comparable to the second step of the SPF algorithm.

The invention may be more fully understood from the following detailed description of a specific embodiment, taken in the light of the accompanying drawing and the appended claims.

DETAILED DESCRIPTION

Figure 1:
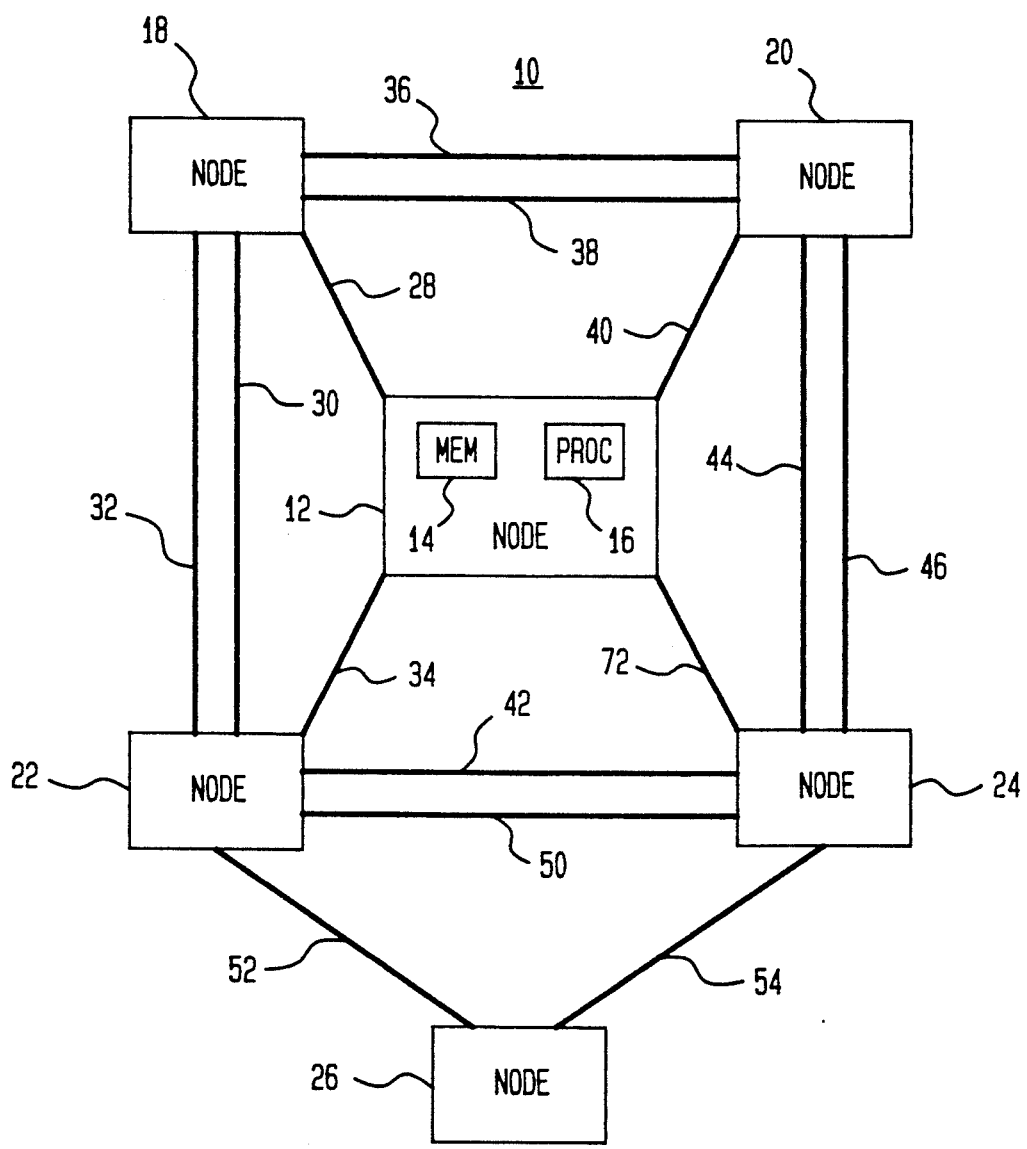
FIG. 1 is a block diagram of a multiple node, multiple link distributed digital communication system of the type to which route selection methods according to the present invention are particularly applicable.

An important application of the invention may be found in an enterprise network 10 like that shown in block diagram form in FIG. 1. In FIG. 1, network 10 has a headquarters node 12 with its own internal memory (MEM) 14 and processor (PROC) 16. In addition, by way of further example, network 10 includes five remote nodes 18, 20, 22, 24, and 26 at geographically different sites. By way of example, each of the remote nodes may represent offices or factory locations. Each of the remote nodes may, furthermore, also have its own internal memory and processor.

Interconnecting the various nodes in network 10 are a number of internodal links (INLS) 28, 30, 32, 34, 36, 38, 40, 42, 44, 46, 48, 50, and 52. Thus, link 28 connects headquarters node 12 with remote node 18. Links 30 and 32 are parallel links interconnecting remote nodes 18 and 22. Link 34 connects headquarters node 12 with remote node 22. Links 36 and 38 are parallel links interconnecting remote nodes 18 and 20. Link 40 connects headquarters node 12 with remote node 20. Link 42 connects headquarters node 12 with remote node 24. Links 44 and 46 are parallel links interconnecting remote nodes 20 and 24. Links 48 and 50 are parallel links interconnecting remote nodes 22 and 24. Finally, link 52 interconnects remote nodes 22 and 26, and link 54 interconnects remote nodes 24 and 26. As illustrated, at least some of the remote nodes in network 10 are reachable from headquarters node 12 only through multiple links.

In network 10, each internodal link may be characterized by the attributes of bandwidth, transmission delay, quality, encryption, bandwidth partition, and cost. Bandwidth represents the capacity of a link in bits per second. Transmission delay depends largely upon the nature of the link. A terrestrial link, for example, offers much less delay than does a satellite link. Quality represents the transmission performance of a link and is typically monitored and measured in terms of bit error rate. Bit error rate is a ratio of the number of bits that become corrupted on the link to the number of bits being transmitted over the link. To provide encryption, a link can be equipped with a data encryption circuit allowing the link to carry user data in encrypted form. Bandwidth partition permits a user of network 10 to define a plurality of internodal link groups, in which an individual link may belong to one or more groups. Finally, each link contributes to the cost of an internodal connection, the total cost of the connection being the sum of the costs of its component links.

The cost of a particular link may be defined in a number of ways. First of all, cost may be determined simply in terms of hop count. Each hop, which is a single internodal link, may be assigned a cost equal to unity. In terms of hop count, the connection cost between nodes in network 10 is equal to the total number of hops. A second approach involves user defined cost. Thus, a user may define a connection cost on the basis of propagation delay, with a specific cost figure assigned to each internodal link. Such a cost may, by way of example, be based upon the physical length of an internodal link. Finally, cost may be defined in terms of transit delay. Transit delay is the delay experienced by a user data packet at each node in network 10 and is the sum of any processing delay at each node and any queuing delay incurred while the packet is waiting for an outbound internodal link to be established. Processing delay is constant and queuing delay is based on the total bandwidth of the link and the actual number of packets being transferred on the link at a particular time.

Network 10 permits a user to predefine permanent virtual circuits interconnecting various nodes. At any particular node (such as headquarters node 12), a human node administrator may define the profile of each internodal channel connection and store them in memory 14. Such a profile may include channel speed in bits per second, whether or not encryption is required, acceptable error rate, acceptable transmission delay in terms of maximum number of satellite hops permitted, any bandwidth partition through which the channel connection should be routed, and the cost type. Such an administrator may choose one of the four cost types, i.e., hop count, user defined cost, transit delay, or user defined cost plus transit delay. With the aid of channel profile and the chosen cost criterion, the present invention permits rapid selection of the least cost route for completing a connection.

Because network 10 supports predefined permanent virtual circuits, an administrator needs to define channel connection profiles in advance. Then, when the connection establishment begins, all connection profiles are already known. The connection establishment procedure sorts the profiles so that connections with identical profiles are established sequentially. Also, in an environment where a substantial number of predefined permanent virtual circuits are established between two nodes, the probability that successive connection requests will have identical requirements is very high. In other words, sequential connection requests between the same nodes tend to have a common set of requirements.

An example best illustrates the use of predefined permanent virtual circuits. In network 10, in this example, there are 14 different internodal links. By way of example, links 30, 42, 48, and 54 are encrypted links. All other links are non-encrypted. Each division of the exemplary hypothetical enterprise is connected to its own node and the human administrator at headquarters node 12 wishes to configure the following channel connections between headquarters node 12 and remote node 18:

Connection 1: This connection is for use by a Manufacturing Department at node 18. It needs a bandwidth of 64,000 bits per second (bps) and a link with medium error quality is acceptable. The connection does not need an encrypted link.

Connection 2: This connection is for use by a Sales Department at node 18. It needs a bandwidth of 19,200 bps and a link with medium error quality is acceptable. The connection does not need an encrypted link.

Connection 3: This connection is for use by an Engineering Department at node 18. A link with medium error quality is acceptable. It needs a bandwidth of 64,000 bps and a non-encrypted link is acceptable.

Connection 4: This connection is for use by a Payroll Department at node 18. It needs a bandwidth of 9600 bps and an encrypted link with a low error rate.

As can be seen from the indicated connection requirements, connections 1 through 3 have identical requirements, i.e., a non-encrypted link with medium error rate. Connection 4 is different because it needs an encrypted link with high quality.

The present invention permits the least cost route from node 18 to headquarters node 12 to be calculated in processor 16 and stored in memory 14 when the first connection request is made. In this example, the least cost route is internodal link 28 out of node 18. Link 28 has an available bandwidth of 1,544,000 bps. Thus, after the first connection is made, 1,480,000 bps is still available on the link.

From an important aspect of the invention, when the second connection request is made its connection requirements are compared in processor 16 with the connection requirements stored in memory 14 for the previous connection. Since they are the same and internodal links along the route have enough bandwidth, the same route (already stored in memory 14) is established, i.e., internodal link 28. The same route also satisfies the third connection request. When the fourth connection request is made, since the connection requires an encrypted link, a new least cost route is determined in processor 16 to meet the connection requirements. Such a route is, in this example, a combination of internodal links 30, 48, and 42. All of these links provide encryption and, end to end, provide the necessary transmission path from node 18 to headquarters node 12 by way of remote nodes 22 and 24. Significant time is saved in comparison with prior art practice because new least cost routes do not need to be calculated for connections 2 and 3.

A further aspect of the invention permits selection of an alternate route. To understand this aspect of the invention, consider that when the third connection request is made, a bandwidth of 48,000 bps is available on link 28, the primary least cost route already calculated in processor 16 and stored in memory 14. The third connection needs 64,000 bps. For this example, when connection request 1 was made, it was determined that an alternate route to get to node 12 would be internodal link 32, followed by link 34. This alternate route is stored in memory 14. Each of links 32 and 34 has a bandwidth of 128,000 bps available. Since this bandwidth is adequate for channel connection request 3, this alternate path is provided in response to connection request 3. The alternate path already stored in memory 14 saves time for connection request 3 by avoiding need for a new least cost calculation.

The process which has been described in connection with network 10 in FIG. 1 may be implemented by software provided to control processor 16 in headquarters node 16. An example of such software is illustrated by the flow charts shown in FIGS. 2 through 7 and by the pseudo code contained in Appendix A.

Figure 2:
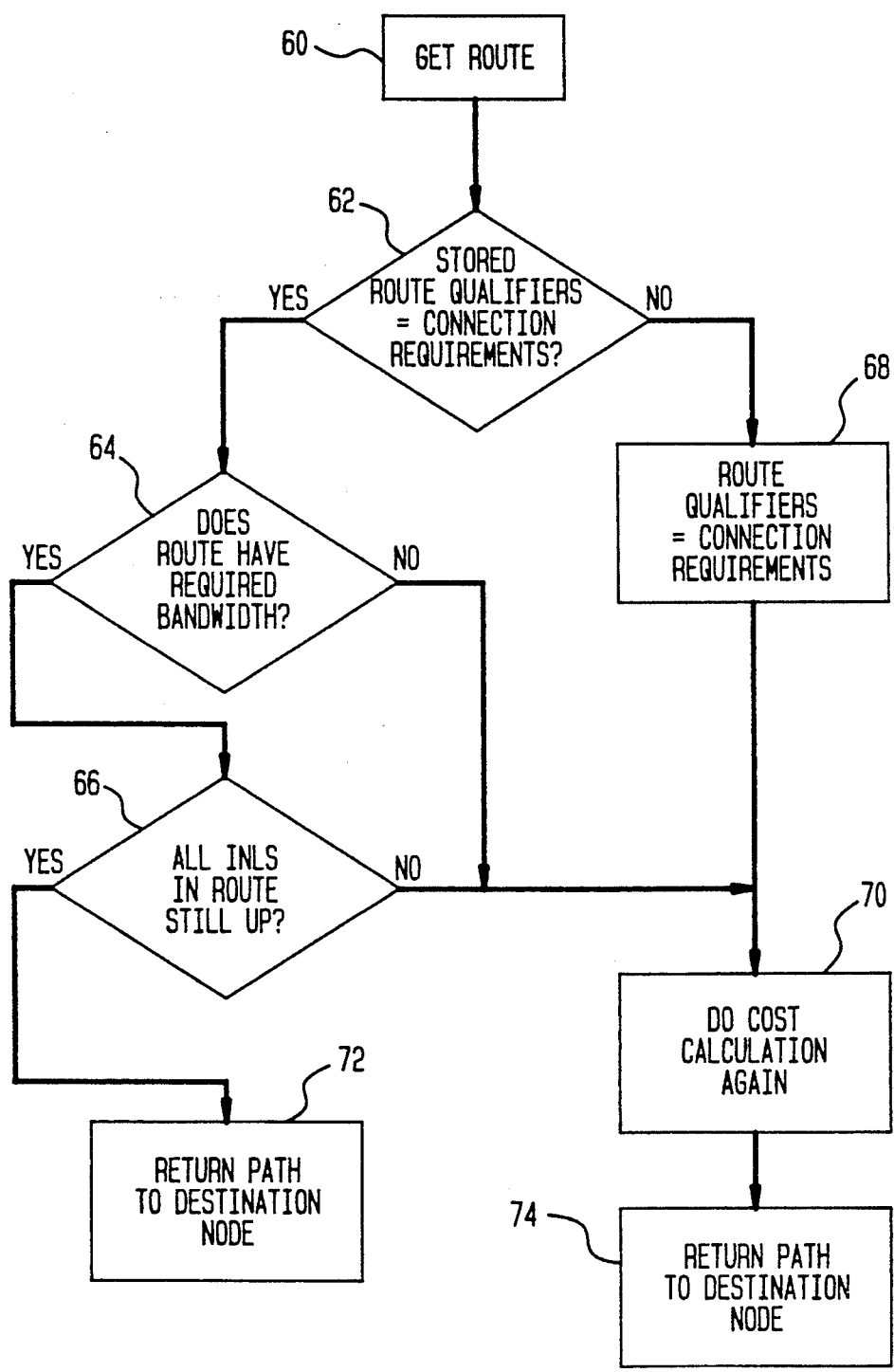
FIG. 2 is a flow chart of a basic route selection process in accordance with the invention.

An example of the basic route selection process used in implementation of the invention, is illustrated by the flow chart in FIG. 2 and includes steps 60, 62, 64, 66, 68, 70, 72, and 74. There, the step 60 "GET ROUTE" signifies the beginning of the process. Steps 62, 64, and 66 represent decision steps in the process and have both YES and NO outputs. Step 62 is "STORED ROUTE QUALIFIERS=CONNECTION REQUIREMENTS ?", step 64 is "DOES ROUTE HAVE REQUIRED BANDWIDTH ?", and step is "ALL INLS IN ROUTE STILL UP ?". Steps 68 and 70 are further steps in the process. Step 68 is "ROUTE QUALIFIERS= CONNECTION REQUIREMENTS ?" and step 70 is "DO COST CALCULATION AGAIN ?". Steps 72 and 74 are process outputs or end results and are both "RETURN PATH TO DESTINATION NODE".

As illustrated, step 60 supplies an input to decision step 62. The YES output of decision step 62 provides input to decision step 64, the YES output of which provides input to decision step 66. The YES output of decision step 66 provides input to output step 72. The NO output of decision step 62 provides input to step 68, which in turn provides input to step 70. Step 70 provides input to output step 74. The NO output of decision step 64 provides input to step 70, as also does the NO output of decision step 66.

In operation, the process illustrated in FIG. 2 first checks through step 62 to see if the current connection requirements (i.e., qualifiers) are the same as the route qualifiers used in the previous connection request. If they are (a YES decision), there is a good chance that the route calculated previously and stored will be applicable for the current qualifiers. The process then checks through step 64 to see if the previously calculated and stored route has enough bandwidth to satisfy the current request. If the bandwidth is adequate (a YES decision) the process checks through step 66 to make sure that the previously calculated and stored route is still operational. If it is (a YES decision), step 72 returns the previously calculated and stored route to the requestor.

In FIG. 2, if step 62 finds that the current connection requirements do not match previous requirements (a NO decision), step 68 saves the current requirements as route qualifiers, step 70 does a new route calculation, and step 74 returns the newly calculated route to the requestor. If step 64 determines that the previously calculated route does not have enough bandwidth (a NO decision) or if step 66 determines that the previously calculated route is no longer operational, step 70 does a new route calculation and step 74 returns the newly calculated route to the requestor.

Because the topology of network 10 in FIG. 1 may change, either by adding or deleting nodes and/or links, the process illustrated in FIG. 2 may also be used to provide continuous updating of the least cost routes stored in memory 14. Such updating may advantageously be accomplished as a background operation in processor 16. Thus, when the topology of network 10 changes, the process shown in FIG. 2 is run in processor 16 to calculate and store in memory 14 a least cost route from headquarters node 12 to each of the remaining nodes. In each such calculation, each link in the resulting least cost route satisfies the connection requirements stored in memory 14 from the most recent connection request. In response to future connection requests, the stored least cost route from the originating node to a designated destination node is established without further calculation if the new connection requirements match those stored in memory 14.

Figure 3:
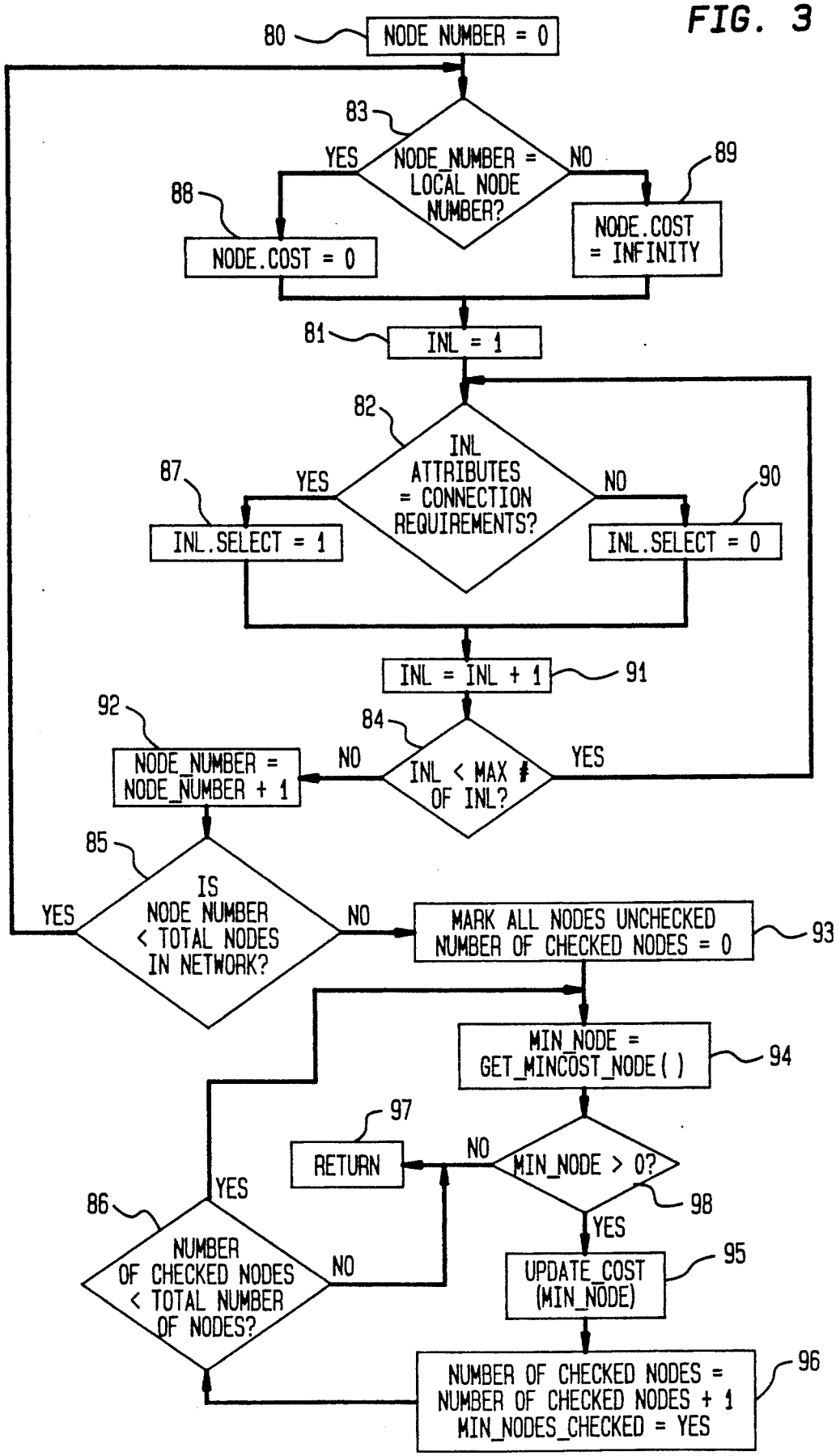
FIG. 3 is a flow chart of the cost calculation process used in the route selection flow chart of FIG. 2.

An example of the cost calculation process in step 70 in FIG. 2 is shown by the flow chart in FIG. 3, which includes steps 80, 81, 82, 83, 84, 85, 86, 87, 88, 89, 90, 91, 92, 93, 94, 95, 96, 97, and 98. There, the beginning step 80 is "NODE NUMBER=0", which initiates the process. Steps 82, 83, 84, 85, 86, 87, and 98 represent decision steps in the cost calculation process and have both YES and NO outputs. Decision step 82 is "INL ATTRIBUTES=CONNECTION REQUIREMENTS ?", decision step 83 is "NODE NUMBER=LOCAL NODE NUMBER ?", and decision step 84 is "INL<MAX # OF INL ?". Decision step 85 is "IS NODE NUMBER<TOTAL NODES IN NETWORK ?" and decision step 86 is "NUMBER OF CHECKED NODES<TOTAL NUMBER OF NODES ?". Decision step 98 is "IF MIN_NODE.0". Steps 81, 87, 88, 89, 90, and 91 are additional steps in the cost calculation process. Step 81 is "INL=1", where INL stands for internodal link. Step 87 is "INL.SELECT=1", step 88 is "NODE.COST=0", step 89 is "NODE.COST=INFINITY", step 90 is "INL_SELECT=0", and step 91 is "INL=INL+1". In this notation, a dot separating sequences of characters represents a structure variable in programming language, and an equality sign indicates the assignment of a value to a variable.

Still additional steps in the cost calculation process are steps 92, 93, 94, 95, 96, and 97. Step 92 is "NODE NUMBER=NODE NUMBER+1", step 93 is a two part step which includes "MARK ALL NODES UNCHECKED" and "NUMBER OF CHECKED NODES=0". Step 94 is "MIN_NODE=GET_MIN_COST_NODE()" and step 95 is "UPDATE_COST(MIN_NODE)". Step 96 is another two part step "NUMBER OF CHECKED NODES=NUMBER OF CHECKED NODES+1" and "MIN_NODE.CHECKED=YES". Finally, step 97 is "RETURN". In this notation, expressions within parentheses represent variables modifying recurrences of the variables outside the parentheses and empty parentheses are indicative of a function.

As illustrated, step 80 supplies an input to decision step 83. The YES output of decision step 83 provides input to step 88, which provides input to step 81. The NO output of decision step 83 provides input to step 89, which also provides input to step 81. Step 81 provides input to decision step 82, the YES output of which provides input to step 87 and the NO output of which provides input to step 90. Steps 87 and 90 both provide input to step 91.

Step 91 provides input to decision step 84, the YES output of which provides input to decision step 82. The NO output of decision step 84 provides input to step 92. Step 92 provides input to decision step 85, the YES output of which provides input to decision step 83. The NO output of decision step 85 provides input to step 93, which in turn provides input to step 94. Step 94 provides input to decision step 98, the YES output from which provides input to step 95. Step 95, in turn, provides input to step 96. Step 96 provides input to decision step 86, the NO output of which provides input to step 97. The NO output of decision step 98 provides input to step 97. Finally, the YES output of decision step 86 provides input to step 94.

In operation, the process illustrated in FIG. 3 begins with step 80 by setting the node number equal to zero. Step 83 checks to see whether the node number set by step 80 is equal to the local node number (i.e., that of headquarters node 12). A YES output from step 83 causes step 88 to set the cost to reach the node equal to zero. A NO output from step 83 causes step 89 to set the cost to reach the node equal to infinity. Step 81 then sets INL equal to one. Step 82 checks to determine whether or not the attributes of the first INL match the connection requirements. A NO output from step 82 indicates that there is no match, causing step 90 to mark that INL as not selected. A YES output from step 82 indicates that there is a match, causing step 87 to mark that INL as selected. Step 91 increments the number of the INL by one and step 84 checks to see if the number of INLS checked is less than the maximum number of INLS in the network. A YES output from step 84 reinitiates decision step 82 with an incremented INL. A NO output from step 84 initiates step 92.

Step 92 in FIG. 3 increments the node number by one, causing step 85 to determine whether the incremented node number exceeds the total number of nodes in the network. If it does not, the cost calculation process returns to step 83. If the incremented node number does exceed the total number of nodes in the network, the process passes to step 93, which marks all nodes as unchecked and sets the number of checked nodes at zero.

Step 93 in FIG. 3 sets a cost calculation flag for all nodes as incomplete and sets the number of nodes for which the cost to reach has been calculated to zero. Step 94 (shown in more detail in FIG. 4) is a function which determines the next minimum cost INL and step 95 updates the cost to reach all other nodes through the minimum cost INL. Step 96 increments the number of nodes the MIN_NODE.CHECKED flag at YES. Step 86 determines whether the number of checked nodes (whose cost to reach have been calculated) is less than the total number of nodes in the network, the process returns to step 94. Otherwise, the route calculation is completed and the process terminates in step 97 with a return.

Figure 4:
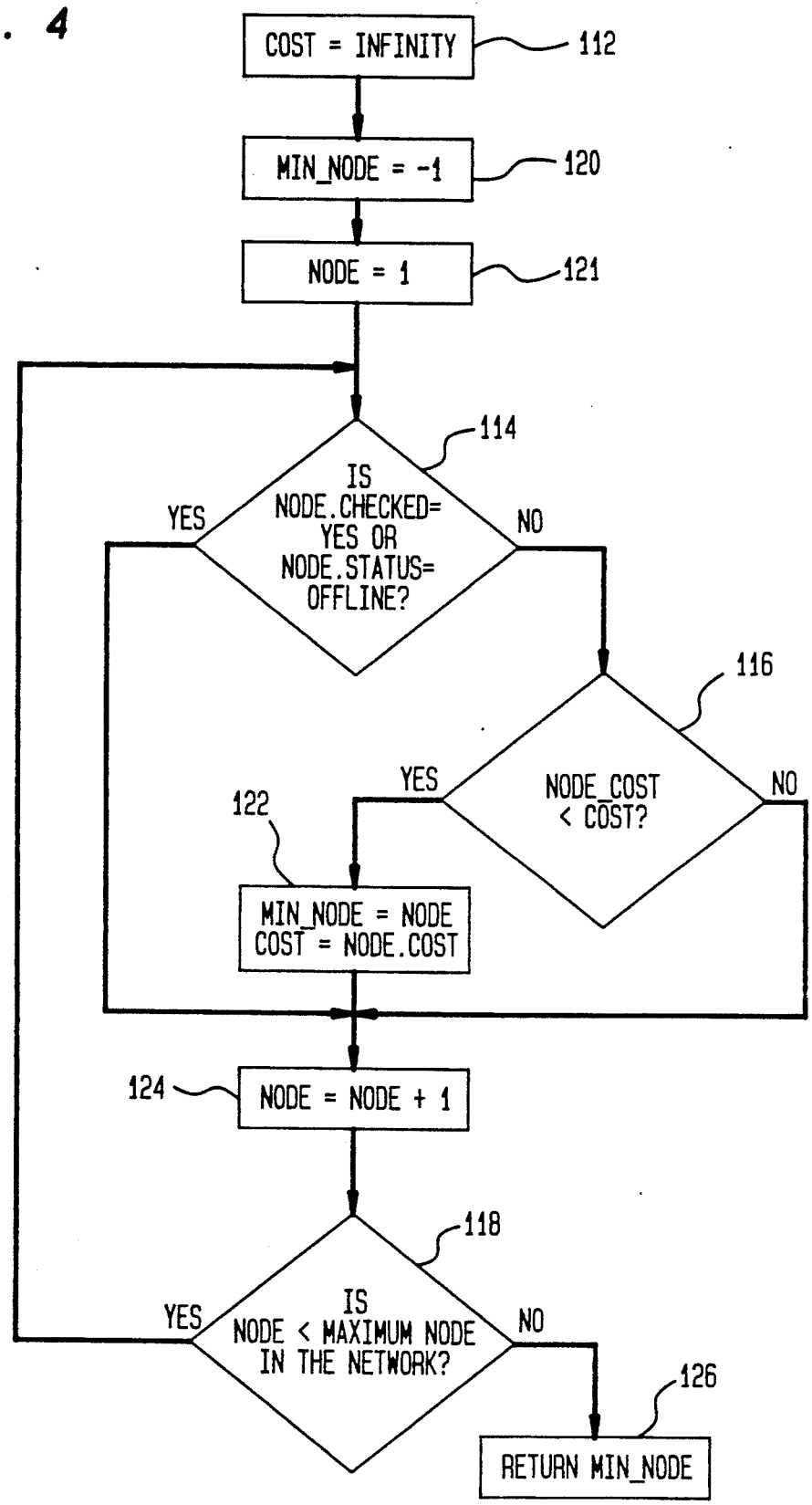
FIGS. 4 and 5 are flow charts of functions used in the process of FIG. 3.

An example of the GET_MINIMUM_COST_NODE function in step 102 is illustrated by the flow chart in FIG. 4, which includes steps 112, 114, 116, 118, 120, 121, 122, 124, and 126. There, a step 112 "COST=INFINITY" marks the beginning of the function. Steps 114, 116, and 118 are decision steps and have YES and NO outputs. Decision step 114 is "IS NODE.CHECKED=YES OR NODE.STATUS=OFFLINE ?", decision step 116 is "NODE COST<COST ?", and decision step 118 is "IS NODE<MAXIMUM NODE IN THE NETWORK ?". Steps 120, 121, 122, 124 and 126 are further steps in the function. Step 120 is "COST=INFINITY" and step 121 is "NODE=LAST_NODE". Step 122 has two parts, "MIN_NODE=NODE" and "COST=NODE.COST". Step 124 is "NODE=NODE+1" and step 126 is "RETURN MIN_NODE".

As shown, step 112 provides input to step 120, which in turn provides input to step 121. Step 121 provides input to decision step 114. A YES output from decision step 114 provides input to step 124. A NO output from decision step 114 provides input to decision step 116. A YES output from decision step 116 provides input to step 122, while a NO output from decision step 116 provides input directly to step 124. Step 122 provides input to step 124. Step 124 provides input to decision step 118. A YES output from decision step 118 provides input back to decision step 114, while a NO output from decision step 118 provides input to step 126.

In operation, the GET_MINIMUM_COST_NODE function illustrated in FIG. 4 begins with step 112 setting a local variable called COST to infinity. Step 120 then sets MIN_NODE at −1 and step 121 sets NODE equal to 1. The function then proceeds to decision step 114. A YES output from decision step 114 means that the cost of the path for reaching this node has already been calculated, i.e., the cost calculation flag is complete, or that the node is off line, in which case the function proceeds to step 124 A NO output from decision step 114 means that the cost of the path for reaching this node has not yet been calculated and that the node is on line. Decision step then determines whether or not the cost to get to this node, i.e., the INL cost, is less than COST. A YES output from decision step 116 indicates that the cost to get to this node is less than COST, whereupon step 122 sets MIN_NODE to the current node number and sets COST equal to the cost to get to this node. A NO output from decision step 166 causes the function to proceed directly to step 124.

Step 124 in the function illustrated in FIG. 4 increments the node number and initiates decision step 118. A NO output from decision step 118 indicates that all nodes in the network have been checked, whereupon the function goes on to step 126, which returns MIN_NODE. A YES output from decision step 118 reinitiates decision step 114 with the incremented node number.

Figure 5:
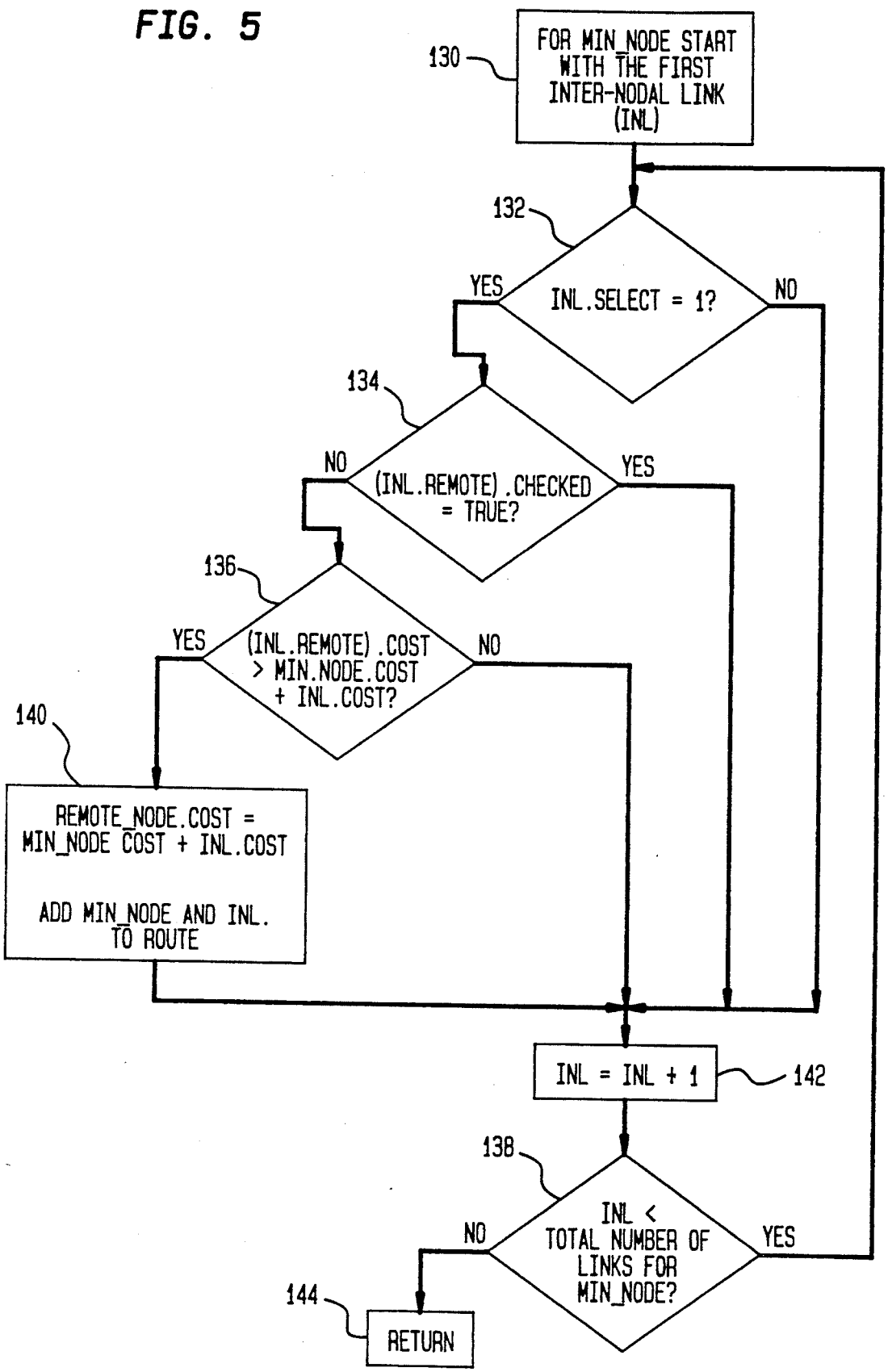

An example of the UPDATE_COST function in step 104 is shown by the flow chart in FIG. 5, which includes steps 130, 132, 134, 136, 138, 140, 142, and 144. In FIG. 5, the function begins with step 130 "FOR MIN_NODE START WITH THE FIRST INTERNODAL LINK (INL)". Steps 132, 134, 136, and 138 are decision steps and have YES and NO outputs. Step 132 is "INL.SELECT=1 ?", step 134 is "(INL.REMOTE).CHECKED=TRUE ?", step 136 is "(INL.REMOTE).COST>MIN.NODE.COST+INL.COST ?", and step 138 is "INL<TOTAL NUMBER OF LINKS FOR MIN_NODE ?". Steps 140, 142, and 144 are additional steps in the function. Step 140 has two parts, "REMOTE_NODE.COST=MIN_NODE.COST+INL.COST" and "ADD MIN_NODE AND INL TO ROUTE". Step 142 is "INL=INL+1" and step 144 is "RETURN".

As illustrated, step 130 provides input to decision step 132. A YES output from decision step 132 provides input to decision step 134 and a NO output from decision step 134 provides input to decision step 136. A YES output from decision step 136 provides input for step 140, which in turn provides input to step 142. A NO output from decision step 132 provides direct input to step 142, as also do a YES output from decision step 134 and a NO output from decision step 136.

Step 142 in the UPDATE_COST function shown in FIG. 5 provides input to decision step 138. A NO output from decision step 138 provides a return, while a YES output from decision step 138 provides input to decision step 132.

In operation, step 130 begins with the first INL by setting an INL index equal to one. Decision step 132 determines whether the first INL is selected, decision step 134 determines whether a cost calculation flag for the node at the remote end of the INL is set to incomplete. Decision step 136 determines whether the cost to reach the node at the remote end of the INL is less than the sum of the cost to get to the MIN_NODE plus the INL cost. A YES, NO, YES sequence of answers through decision steps 132, 134, and 135 initiates step 140, which sets the cost of reaching the remote node equal to the MIN_NODE cost plus the INL cost and then adds MIN_NODE and INL to the route to reach the remote node. The function then moves to step 142.

If the INL is not selected in step 132, if the cost calculation flag for the node at the remote end of the INL is set to complete in step 134, or if the sum of MIN_NODE cost and INL cost is greater than the cost to get to the remote node, the route to the remote node and the cost to reach that node are not updated. Instead, the function proceeds directly to step 142.

The INL index is incremented in step 142. If decision step 138 determines that the INL index is less than the total number of INLS for MIN_NODE and provides a YES output, decision step 132 is reinitiated. A NO output from decision step 138 provides a return through step 144.

Figure 6:
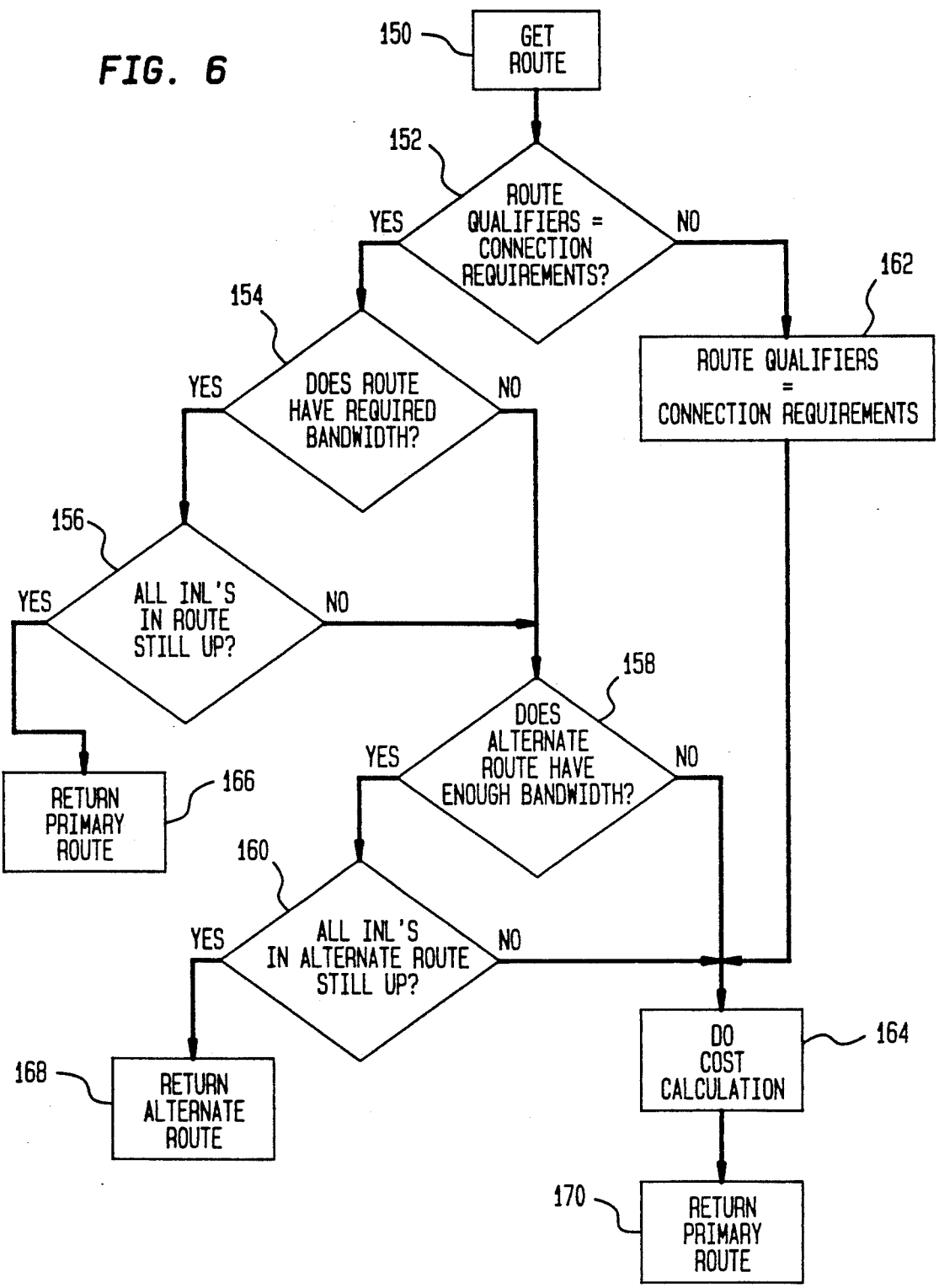
FIG. 6 is a flow chart showing a modification, according to the invention, of the basic route selection process illustrated in FIG. 2.

An example of a modification to the basic route selection process illustrated in FIG. 2 to provide an alternate path is shown by the flow chart in FIG. 6, which includes steps 152, 154, 156, 158, 160, 162, 164, 166, 168, and 170. In FIG. 6, the process begins with step 150 "GET ROUTE". Steps 152, 154, 156, 158, and 160 are decision steps and have YES and NO outputs. Decision step 152 is "ROUTE QUALIFIERS=CONNECTION REQUIREMENTS?" and decision step 154 is "DOES ROUTE HAVE REQUIRED BANDWIDTH?". Decision step 156 is "ALL INLS IN ROUTE STILL UP?", decision step 158 is "DOES ALTERNATE ROUTE HAVE ENOUGH BANDWIDTH", and decision step 160 is "ALL INLS IN ALTERNATE ROUTE STILL UP?".

Steps 162, 164, 166, 168, and 170 are additional steps in the process illustrated in FIG. 6. Step 162 is "ROUTE QUALIFIERS=CONNECTION REQUIREMENTS" and step 164 is "DO COST CALCU- LATION". Step 166 is "RETURN PRIMARY ROUTE", step 168 is "RETURN ALTERNATE ROUTE", and step 170 is "RETURN PRIMARY ROUTE".

As illustrated, step 150 provides input to decision step 152. A YES output from decision step 152 provides input to decision step 154 and a YES output from decision step 154 provides input to decision step 156. A NO output from decision step 152 provides input to step 162, which in turn provides input to step 164. Both a NO output from decision step 154 and a NO output from decision step 156 provide input to decision step 158.

A YES output from decision step 158 provides input to decision step 160, while a NO output from decision step 158 provides input to step 164. A YES output from decision step 160 provides input to step 168, while a NO output from decision step 160 provides input to step 164. Step 164, in turn, provides input to step 170.

In operation, the process in FIG. 6 is initiated by a connection request, beginning with step 150. Decision step 152 then checks to determine if the current connection requirements (i.e., qualifiers) are the same as the route qualifiers used in the previous connection request. A YES output indicates that they are and there is a chance that the route calculated previously will be applicable for the current qualifiers. Decision step 154 verifies that the previously calculated route has enough bandwidth to carry the current channel. A YES output from decision step 15 indicates that the bandwidth is adequate, permitting decision step 156 to check to determine if each INL in the previously calculated route is still operational. A YES output from decision step 156 causes step 166 to return the primary route, avoiding any necessity for a recalculation.

A NO output from decision step 152 indicates that current connection requirements do not match previous requirements and initiates step 162, which saves the current requirements as route qualifiers. Step 164 then performs a route calculation and step 170 returns the calculated route to the requestor.

Modification of the route selection process illustrated in FIG. 2 begins in FIG. 6 with a NO output from either decision step 154 or decision step 156. A NO output from decision step 154 indicates that the previously calculated route does not have enough bandwidth. Then, decision step 158 checks to see if the previously calculated and stored alternate route has enough bandwidth. A YES output from decision step 158 indicates that the stored alternate route does have enough bandwidth and initiates decision step 160, which determines whether all INLS in the stored alternate route are still operational. A YES output from decision step 160 indicates that they are and step 168 returns the alternate route, avoiding any need for recalculation.

A NO output from either decision step 158 or decision step 160 triggers a cost calculation by step 164. A NO output from decision step 158 indicates that the stored alternate route does not have enough bandwidth and a NO output from decision step 160 indicates that not all of the INLS in the stored alternate route are still operational. After step 164 performs a new cost calculation, step 170 returns a new primary route.

Figure 7:
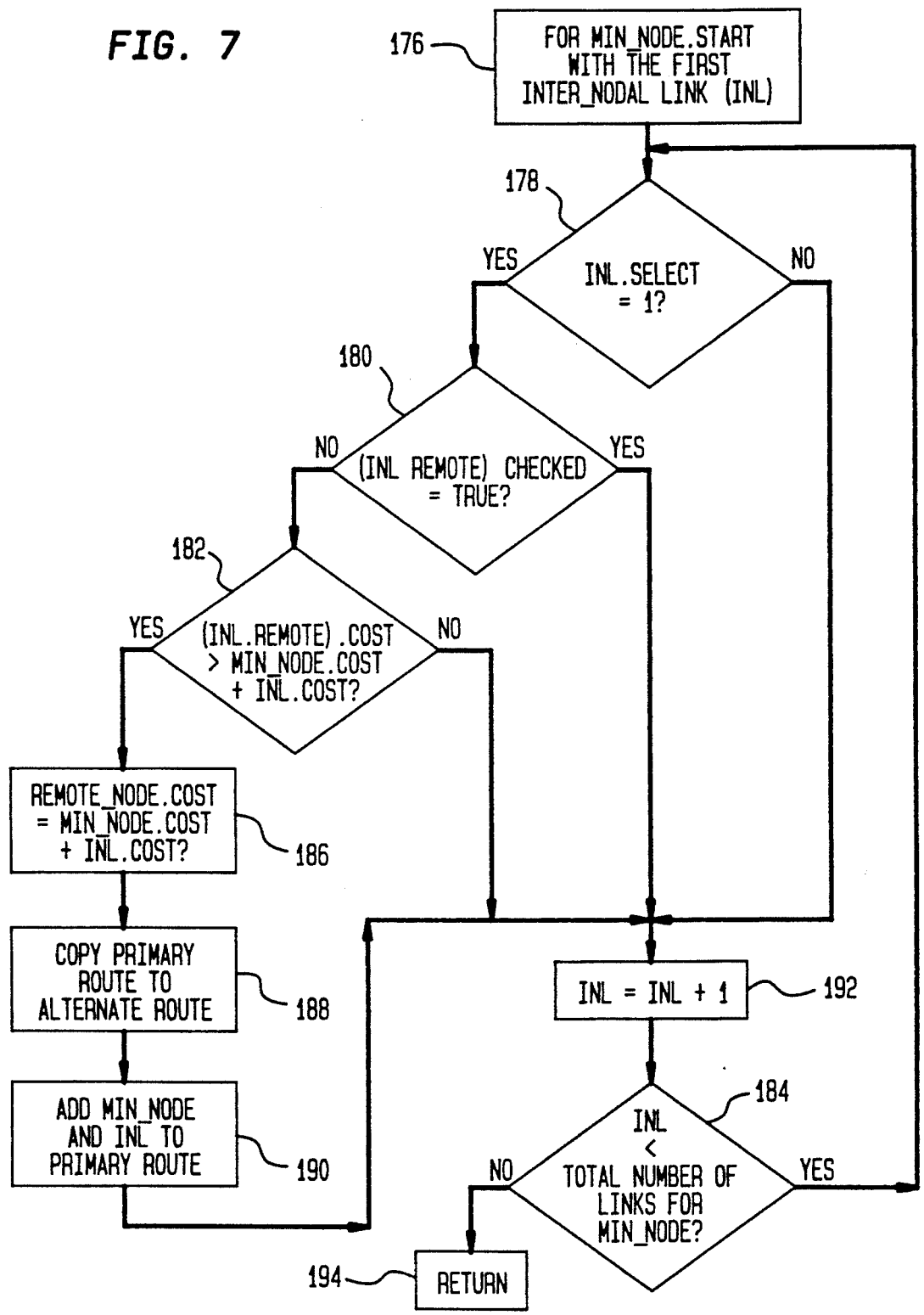
FIG. 7 is a flow chart of the function illustrated in FIG. 4, modified to meet the needs of the process of FIG. 6.

FIG. 7 is a flow chart of an UPDATE_COST function suitable for use as step 164 in the alternate route selection process shown in FIG. 6. In FIG. 7, the function includes steps 176, 178, 180, 182, 184, 186, 188, 190, 192, and 194. Specifically, the function begins with step 176 "FOR MIN_NODE, START WITH THE FIRST INTER NODAL LINK (INL)". Steps 178, 180, 182, and 184 are decision steps and have YES and NO outputs. Decision step 178 is "INL.SELECT=1 ?" and decision step 180 is "(INL.REMOTE).CHECKED=-TRUE ?". Decision step 182 is "(INL.REMOTE).-COST>MIN_NODE.COST+INL.COST ?" and decision step 184 is "INL>TOTAL NUMBER OF LINKS FOR MIN_NODE ?".

Steps 186, 188, 190, 192, and 194 are additional steps in the function illustrated in FIG. 7. Step 186 is "REMOTE_NODE.COST+MIN_NODE.COST+INL.COST", step 188 is "COPY PRIMARY ROUTE TO ALTERNATE ROUTE", and step 190 is "ADD MIN_NODE AND INL TO PRIMARY ROUTE". Step 192 is "INL=INL+1" and step 194 is "RETURN".

As illustrated, step 176 provides input to decision step 178. A YES output from decision step 178 provides input to decision step 180. A NO output from decision step 180 provides input to decision step 182. A YES output from decision step 182 provides input to step 186, initiating steps 186, 188, and 190 in sequence. Step 190, a NO output from decision step 178, a YES output from decision step 180, and a NO output from decision step 192 all provide input to step 192. Step 192 in turn provides input to decision step 184, a NO output from which initiates step 194. A YES output from decision step 184 provides input to decision step 178.

The function illustrated in FIG. 7 begins in step 176 with the first INL by setting the INL index to 1. If step 178 selects that INL by a YES output, step 180 determines that the cost calculation flag for the node that is at the remote end of the INL is set to incomplete by a NO output, and step 182 determines that the cost to reach the node at the remote end of the INL is less than the sum of the cost to get to the MIN_NODE plus the INL cost, then step 186 sets the cost of reaching the remote node equal to the MIN_NODE cost plus the INL cost. Step 188 then copies the current primary route to the alternate route.

Step 190 adds MIN_NODE and INL to the remote node primary route and step 192 increments the INL index. Decision step 184 determines whether the INL index is less than the total number of INLS for MIN_NODE. A YES output from decision step 184 reinitiates decision step 178. A NO output from decision step 184 initiates step 194, which provides a return.

If the INL is not selected, as indicated by a NO output from decision step 178, if the cost calculation flag for the node at the remote end of the INL is set to complete, as indicated by a YES output from decision step 180, or if the sum of MIN_NODE cost and INL cost is greater than the cost to get to the remote node, as indicated by a NO output from decision step 182, step 192 is initiated directly. The route to the remote node and the cost to reach the remote node are not updated by steps 186, 188, and 190.

Pseudo code illustrating the manner in which the processes and functions illustrated in FIGS. 2 through 7 may be programmed is given in Appendix A.

It is to be understood that the embodiments of the invention which have been described are illustrative. Numerous other arrangements and modifications may be readily devised by those skilled in the art without departing from the spirit and scope of the invention.

APPENDIX A

```
#define    RET_OK              0
#define    RET_FAIL            1
define    INFINITY            0xFFF0 define SELECT                 0x20
define NOT_SELECTED           0xDF

// general constants
#define MAX_HOP                16
#define MAX_NODE               2048
#define MAX_NODE_REG           256
define MAX_INL                31 typedef unsigned short tNODE;    // node identifier (physical)
typedef unsigned char  tINL;     // INL identifier  (range 1 to 31)
typedef unsigned char  tBYTE;
typedef unsigned long  tLONG;

// A user requesting a route sets up the following
// structure when requesting a route.

struct sRouteQualifier {
        int security;       // = 2 if encryption required, = 1 otherwise
        int maxSatHops;     // max number of satellite hops (0 .. 15)
        int INLquality;     // BER quality acceptable (1 .. 15)
        int partition;      // INL partition (0 .. 7, 0 = do not care)
        int user_domain;    // INL domain (1 .. 1024, 1 = global domain)
        int maxCost;        // Maximum cost (1 .. )
        unsigned long loading ;  // in bits per second
};

// Route Agent sets up the route in the route structure shown below.
// The route contains node numbers ranging from 1 to 2048 for all nodes
// that lead up to the destination node. Destination node number is not
// included in the route.
// The route structure also contains INL identifiers (1..31), starting from
// the outbound link id at the source node.
// All unused entries in the route are initialized to 0.

struct sRouteStruc {
        tNODE nodenum[MAX_HOP];   // node number ( 1 .. 2048)
        tINL  inlId  [MAX_HOP];   // INL id (1 .. 31)
} ;

struct sRANodeProperty { struct sRouteStruc route;        // least cost route to node struct sRouteStruc alt_route;    // alternate route to node tBYTE   status;

// Indicates the status of a node and it can have one of the following
// values:
// ONLINE ( 1 = ONLINE, 0 = OFFLINE)
// PACKET_BYPASS (1 = BW AVAILABLE, 0 = BW UNAVAILABLE)// packet bypass
//                                                             capability
```

```
//   PACKET_TERM   (1 = BW AVAILABLE, 0 = BW UNAVAILABLE) //packet terminating
//                                                        capability
//   SUBRATE_BYPASS (1 = BW AVAILABLE, 0 = BW UNAVAILABLE) //sub-rate bypass
//   SUBRATE_TERM  (1 = BW AVAILABLE, 0 = BW UNAVAILABLE) //sub-rate
//                                                        //terminating
//   COST_CALC     (1 = DIST CALCULATION COMPLETE, 0 = DIST CALC NOT DONE)
//   Used by the Dijkstra least cost calculation algorithm to indicate
//   if the node has completed the calculation.

//   CHNL_ID_UNAVAIL  (1 = CHNL_ID_UNAVAIL, 0 = CHNL_ID_AVAIL)
//   SPARE tBYTE numINL;        // number of INLs at this node // cost for reaching this node
    unsigned short cost;

// total number of satellite hops required to get to this node
    unsigned short satHops;

tNODE  node_num;     // physical node number
};

// Route Agent Inter node link (INL) structure
struct sRAINLProperty{ tINL rmtInlId;    // 8bit representation of remote INL id

// BIT 7        6          5        4        3        2        1        0
    //   secure  satellite  |      *           current maximum BER
    //                 set to include INL in least cost path calculation
    //          1 = satellite       1 = On critical path
    //          0 = terrest         0 = Not on critical path
    tBYTE property;

// propagation delay
    tBYTE prop_delay;   // user defined cost

// A link can belong to up to 7 bandwidth partitions. One bit is set
    // for each partition this link belongs to
    tBYTE partitions;

// BIT 15         14         13       12       11       10       9        8
    //   ONLINE    ENABLE     SPARE    SPARE    SAT1     SAT2     DOMAIN  DOMAIN
    //1 = Online,  1 = Enabled
    //0 = Offline  0 = Disabled
    // BIT 7         6          5        4        3        2        1        0
    //   --------------------------Domain Value --------------------------
    tWORD status;

tNODE rmtNode;

// Following are in units of Quarter-DS0.
    tWORD bwTotal;
    tWORD bwConnPKT;

// cost of link from 1-65535
    tWORD cost;         // variable used for calculating current cost
    tINL  inlId;        // INL identifier
};
```

```
struct sRANodeProperty raNodes[MAX_NODE_REG] ;           // array of node data
struct sRAINLProperty raINLs[MAX_NODE_REG][MAX_INL] ;    // array of INL info
tNODE  localNode ;                                        // local node number
struct sRouteQualifier prevQual ;                         // previously used
                                                          // qualifiers /* Node Initialization Scenario */
/*
** After a node is reset, the node identifier which is a number in the range
** of 1 to 2048, unique within the network, will be stored in the variable
** localNode. Arrays that contain node and INL information, i.e. raNodes and
** raINLs will be initialized.
**
** Network topology information will be received from adjacent nodes and will
** be stored in the node and INL arrays, i.e. raNodes and raINLs.
**
** Previously used route qualifiers, i.e. structure prevQual is initialized.
*/

/* This pseudo code corresponds to the flow chart in FIG. 2 */
/*
   _Function Name: getRoute
   _Description: This function provides the least cost route based on
    connection requirements.

Input: dest_node : destination node number
           pqual     : points to connection requirements which are stored in
                       a structure of type sRouteQualifier
           proute    : pointer to an area of memory in which retrieveRoute
                       will store the route. The route data structure will
                       be of the type sRouteStruc.

Output: proute   : A valid route to the destination node will be stored,
                       if one could be found, at the location pointed to
                       by proute.

ret_code : RET_OK if route found, RET_FAIL otherwise

*/

// *** STEP 60
getRoute () {

// *** STEP 62
    ret_code = compareQual (pqual);   // compare input qualifiers with
                                      // previously used qualifiers if (ret_code == RET_OK) {         // last qualifiers same as current qual // *** STEP 64, 66
        ret_code = validate_Route (pqual, pointer to Route for the
            destination Node stored in raNodes[destination node number]);

// *** STEP 72
        if (ret_code == RET_OK)
            copy calculated route from raNodes[destination node number] into
                memory pointed to by proute
```

```
            else {
                // *** STEP 70
                ret_code = calculate_Routes (costType, pqual);

if (ret_code == RET_OK)
                    // *** STEP 74
                    copy calculated route from raNodes[destination node number]
into
                    area pointed to by proute
                else
                    ret_code = RET_FAIL ;
            }
        }
        else { /* qualifiers not the same */
            // *** STEP 68, 70
            ret_code = calculate_Routes (costType, pqual);
            if (ret_code == RET_OK)
                // *** STEP 74
                copy calculated route from raNodes into area pointed to by proute
        } return (ret_code) ;
}

/*
    This function compares the input qualifiers with previous qualifiers.
    Input :
            pqual : Pointer to current route qualifiers stored in a data
                    structure of type sRouteStruc.
    Output : ret_code : RET_OK if route found, RET_FAIL otherwise

*/ compareQual() { int ret_code ;

if (contents of pqual == contents of prevQual)
        ret_code = RET_OK ;
    else
        ret_code = RET_FAIL ;
    end
}

/*
    This function validates a route. It verifies that each node in the
    route is online and each link in the route is also online and has enough
    bandwidth to carry the channel.

Input: pqual : pointer to input qualifiers stored in a structure of type
            sRouteQualifier proute : pointer to route stored in a structure of type sRouteStruc Output : ret_code : RET_OK if input route valid, RET_FAIL otherwise

*/
```

```
validate_Route (){ if (contents of proute are non-null) {

// get node number and INL identifier from *proute
        nodeId = node number from the contents of proute ;
        for each node in the contents of proute {
            if (raNodes[nodeId].status != NODE_ONLINE)
                ret_code = RET_FAIL ;
        } for each link in the route {

// get node number and INL identifier from *proute
            nodeId = node number from the contents of proute ;
            inlId = INL id from the contents of proute ;

// check if INL is online
            if (raINLs[nodeId][inlId].status != INL_ONLINE)
                ret_code = RET_FAIL ;

// check if available bandwidth on the link is sufficient
            if (raINLs[nodeId ][inlId].bwTotal - raINLs[nodeId][inlId].bwConn <
                pqual.loading)
                ret_code = RET_FAIL ;
        }
    }
    else
        ret_code = RET_FAIL ;

return (ret_code) ;

}

/*

This is the main routine of the calculate_Routes algorithm. It will first
    initialize variables and determine which INL satisfies the qualifier
    requirement using initNodeLink method. Method generate_Cost
    is called to generate cost values for all nodes.

Input: pqual : pointer to input qualifiers stored in a structure of type
           sRouteQualifier Output: least cost route is stored in raNodes[i].route where i represents
            the node number of each node in the network.

*/ calculate_Routes() {

// copy input qualifiers into previous qualifiers
    // *** STEP 68
    copy contents of pqual into prevQual //call initNodeLink to select links based on input qualifiers
    initNodeLink (pqual) ;
```

```
    // call generate_Cost to calculate cost to all nodes
    generate_Cost () ;

}

/* This pseudo-code corresponds to part of the flow chart in FIG. 3 */
/*
    This function selects INLs based on the input qualifiers.

Input: pqual : pointer to input qualifiers stored in a structure of type
            sRouteQualifier Output : In the array raINLs, each INL with attributes that match input
             qualifiers is marked as selected and costs are initialized.
*/ initNodeLink() { int nodeNumber ;
    int inlId ;

nodeNumber = 0 ;

// visit all nodes in the network
while (nodeNumber < total number of nodes in the network) {

// *** STEP 83
    if (nodeNumber == localNode)
        // *** STEP 88
        raNodes[nodeNumber].cost = 0;    // cost to reach my node is 0
    else
        // *** STEP 89
        raNodes[nodeNumber].cost = INFINITY; // cost to reach any other node
                                             // is very high.

// set COST CALCULATION flag to "NOT DONE"
    raNodes[nodeNumber].status &= COST_CALC_NOT_DONE ;

// if node is not online, set COST CALCULATION DONE if (raNodes[nodeNumber].status &= NODE_OFFLINE)
        raNodes[nodeNumber].status |= COST_CALC_DONE ;
    else {
        // *** STEP 81
        inlId = 1 ;
        // *** STEP 84
        for all links for the node {
            // *** STEP 82
            if (link at raINLs[nodeNumber][inlId] meets input qualifiers) {
                // mark link as selected
                // *** STEP 87
                raINLs[nodeNumber][inlId].property |= SELECT ;
                    calculate INL cost and store it in
                        raINLs[nodeNumber][inlId]
            else {
                // mark link as un-selected
                // *** STEP 90
                raINLs[nodeNumber][inlId].property &= NOT_SELECTED ;
```

```
            }
            // *** STEP 91
            inlId = inlId + 1;
         }
      }
      nodeNumber = nodeNumber + 1 ;
   }
}

/* This psuedo-code corresponds to part of the flow chart in FIG. 3 */
/*
   This function generates the cost of reaching each node in the network.
   It first determines a node with minimum cost and determines the cost to
   reach other nodes through the minimum cost node.

Input : None

Output : For each node in raNodes, the cost and route to get to that node
            from the local node are updated.
*/ generate_Cost() { tNODE minNode ;

int   numberOfNodesChecked ;

numberOfNodesChecked = 0 ;
   minNode = 0 ;

while (numberOfNodesChecked < total nodes in the network && minNode >= 0){

/* get a node with minimum cost */
      // *** STEP 94
      minNode = getMinCostNode();

if (minNode >= 0) {

// compute cost for all nodes via the minimum cost node
         // *** STEP 95
         update_Cost(minNode);

// The least cost computation is completed for minNode.
         // Mark it as DONE
         raNodes[minNodeIndex].status |= COST_CALC_DONE ;

// increment node counter
         numberOfNodesChecked = numberOfNodesChecked + 1 ;
      }
   }
}

/* This psuedo-code corresponds to the flow chart in FIG. 4 */
/*
   This method returns the node number of a node with the lowest cost value
   from the local node.
```

```
    Input  : none
    Output : Minimum cost node number
             If a minimum cost node is not found, a -1 is returned. Otherwise
             the node number is returned.

*/ getMinCostNode() { int  cost ;
    int  minNode ;
    int  nodeNumber ;

// *** STEP 112
    cost = INFINITY;

// *** STEP 120
    nodeNumber = 0 ;
    minNode = -1;

// *** STEP 118
    while (nodeNumber < number of nodes in the network) {
        // is node cost calculation is not done and node is online?

// *** STEP 114
        if (raNodes[nodeNumber].status & COST_CALC_DONE &&
            raNodes[nodeNumber].status & NODE_ONLINE) {

/* yes, this node has the smallest cost value so far ? */
            // *** STEP 116
            if (raNodes[nodeNumber].cost < cost) {
                // *** STEP 122
                cost = raNodes[nodeNumber].cost;
                minNode = nodeNumber ;
            }
        }
        // *** STEP 124
        nodeNumber = nodeNumber + 1 ;
    }

// *** STEP 128
    return (minNode);
}

/* This psuedo-code corresponds to the flow chart in FIG. 5 */

/*

This method updates the cost value for all nodes that are adjacent
    to a given node. This is done by comparing the existing cost value
    of an adjacent node with the sum of link cost and given node cost. The
    link that yields a lower cost figure will be saved in the route.

Input  : minNode
    Output : route to each node that is adjacent to minNode is updated
             with the least cost link.
```

```
*/ update_Cost() { int linkCost ;
    int inlId ;

// *** STEP 130
    inlId = 1 ;

// compute lowest cost value for all its adjacent nodes
    while (inlId <= number of links at minNode) {

// *** STEP 132
        if (raINLs[minNode][inlId].property & SELECT) {

// get the remote node number for this link
            remoteNode = raINLs[minNode][inlId].rmtNode ;

// *** STEP 134
            // if remote node cost calculation is done, skip this link
            if (raNodes[remoteNode].status & COST_CALC_DONE)
                continue ;
            else {

/*
                    is cost value going through the current trunk is lower
                    than the cost value computed so far ?
                */ linkCost = raINLs[minNode][inlId].cost;
                // *** STEP 136
                if (raNodes[remoteNode].cost > minNode cost + linkCost) {

/*
                        yes, update adjacent node's cost value with the new
                        lower value
                    */
                    // *** STEP 140
                    raNodes[remoteNode].cost = raNodes[minNode].cost + linkCost;

/*
                        Set the route to remoteNode equal to the route to minNode
                        appended by INL identifier of this INL.
                    */
                    raNodes[remoteNode].route = raNodes[minNode].route + inlId ;
                }
            }
        }
        // *** STEP 142
        inlId = inlId + 1 ;
    }
}
``` getRoute modified for Alternate Route (corresponds to the flow-chart in FIG. 6)

```
// *** STEP 150
```

```
getRoute () {

// *** STEP 152
    ret_code = compareQual (pqual);    // compare input qualifiers with
                                       // previously used qualifiers if (ret_code == RET_OK) {          // last qualifiers same as current qual // *** STEP 152, 156
        ret_code = validate_Route (pqual, pointer to Route for the
            destination Node stored in raNodes[destination node number]);

if (ret_code != RET_OK) {
            // *** STEP 158
            ret_code = validate_Route (pqual, pointer to Alternate Route for
                destination Node stored in raNodes[destination node number]);

// *** STEP 168
            if (ret_code == RET_OK)  /* Alternate route is valid */
                copy calculated Alternate route from raNodes[destination node
                number] into memory pointed to by proute
            else {
                // *** STEP 164
                ret_code = calculate_Routes (costType, pqual);
                if (ret_code == RET_OK)
                    copy calculated route from raNodes[destination node number]
                    into memory pointed to by proute
                else
                    ret_code = RET_FAIL ;
            }
        }
        else
            // *** STEP 166
            copy calculated route from raNodes[destination node number]
into
            area pointed to by proute
        }
    }
    else { /* qualifiers not the same */
        // *** STEP 164
        ret_code = calculate_Routes (costType, pqual);
        if (ret_code == RET_OK)
            // *** STEP 170
            copy calculated route from raNodes[destination node number]
            into area pointed to by proute
        else
            ret_code = RET_FAIL ;
    } return (ret_code) ;
}
```

Psuedo-code for update_Cost method modified to handle an alternate route
(Corresponds to the flow chart in FIG. 7)

/*

This method updates the cost value for all nodes that are adjacent
   to a given node. This is done by comparing the existing cost value
   of an adjacent node with the sum of link cost and given node cost. The
   link that yields a lower cost figure will be saved in the route.

```
Input : minNode
Output : route to each node that is adjacent to minNode is updated
         with the least cost link.

*/ update_Cost() { int linkCost ;
    int inlId ;

inlId = 1 ;

// compute lowest cost value for all its adjacent nodes
    while (inlId <= number of links at minNode) {

// *** STEP 178
       if (raINLs[minNode][inlId].property & SELECT) {

// get the remote node number for this link
           remoteNode = raINLs[minNode][inlId].rmtNode ;

// *** STEP 180
           // if remote node cost calculation is done, skip this link
           if (raNodes[remoteNode].status & COST_CALC_DONE)
               continue ;
           else {

/*
                is cost value going through the current trunk is lower
                than the cost value computed so far ?
             */ linkCost = raINLs[minNode][inlId].cost;
             // *** STEP 182
             if (raNodes[remoteNode].cost > minNode cost + linkCost) {

// *** STEP 188
                 /* copy primary route to alternate route */
                 memcpy (raNodes[remoteNode].alternate route,
                     raNodes[remoteNode].route, sizeof (route) ;

/*
                     update adjacent node's cost value with the new
                     lower value
                 */

// *** STEP 190
                 raNodes[remoteNode].cost = raNodes[minNode].cost + linkCost;

/*
                     Set the route to remoteNode equal to the route to minNode
                     appended by INL identifier of this INL.
                 */
                 raNodes[remoteNode].route = raNodes[minNode].route + inlId ;
             }
          }
       }
       // *** STEP 142
       inlId = inlId + 1 ;
    }
}
```

What is claimed is:

1. A method for selecting a least cost route from an originating node in a distributed digital communications network to one of a plurality of destination nodes in said network, the nodes in said network being interconnected by links with at least some of said destination nodes being accessible to said originating node only by multiple links, and at least said originating node having a memory and a processor associated therewith, the method comprising the steps of:

receiving in said processor a connection request including a first set of transmission requirements for a route from said originating node to a designated one of said destination nodes;

storing said first set of transmission requirements in said memory;

calculating in said processor and storing in said memory the least cost route from said originating node to said designated destination node in which each link satisfies said first set of transmission requirements;

establishing the route stored in said memory from said originating node to said designated destination node;

receiving in said processor a second service request including a second set of transmission requirements for a route from said originating node to said designated destination node;

comparing, in said processor, said second set of transmission requirements to said first set of transmission requirements stored in said memory;

if said second set of transmission requirements matches said first set of transmission requirements, then validating the route stored in said memory to determine that it is still functional; and establishing the route stored in said memory from said originating node to said designated destination node.

2. The method of claim 1 in which both said first and said second sets of transmission requirements include transmission bandwidth.

3. The method of claim 1 in which both said first and said second sets of transmission requirements include transmission delay.

4. The method of claim 1 in which both said first and said second sets of transmission requirements include bit error rate.

5. The method of claim 1 in which both said first and said second sets of transmission requirements include encryption.

6. The method of claim 1 comprising the additional steps, whenever the configuration of said network changes, of:

recalculating in said processor a least cost route from said originating node to each of said destination nodes in which each link satisfies said first set of transmission requirements;

replacing routes stored in said memory with said recalculated routes; and establishing the recalculated stored least cost route from said originating node to said designated destination node if said second set of transmission requirements matches said first set of transmission requirements.

7. The method of claim 6 in which said recalculation takes place in said processor as a background operation, permitting other operations to be performed as foreground operations.

8. A method for selecting a least cost route from an originating node in a distributed digital communications network to one of a plurality of destination nodes in said network, the nodes in said network being interconnected by links with at least some of said destination nodes being accessible to said originating node only by multiple links, and at least said originating node having a memory and a processor associated therewith, the method comprising the steps of:

receiving in said processor a service request including a first set of transmission requirements for a route from said originating node to a designated one of said destination nodes;

storing said first digital transmission requirements in said memory;

calculating in said processor and storing in said memory a least cost route as a primary route from said originating node to said designated destination node in which each link in said primary route satisfies said first set of transmission requirements;

calculating in said processor and storing in said memory an alternate route from said originating node to said designated destination node in which each link satisfies said first set of transmission requirements, where the cost of said alternate route is no less than the cost of said primary route;

selecting said stored primary route from said memory and establishing it from said originating node to said designated destination node;

receiving in said processor a second service request including a second set of transmission requirements for a route from said originating node to one of said destination nodes;

comparing, in said processor, said second transmission requirements to said first set of transmission requirements stored in said memory;

if said second set of transmission requirements matches said first set of transmission requirements, then validating the stored primary route to determine that it is still functional;

if the stored primary route is not functional, then validating the stored alternate route to determine that it is functional; and establishing the alternate route stored in said memory from said originating node to said designated destination node.

9. The method of claim 8 in which both said first and said second sets of transmission requirements include transmission bandwidth.

10. The method of claim 8 in which both said first and said second sets of transmission requirements include transmission delay.

11. The method of claim 8 in which both said first and said second sets of transmission requirements include bit error rate.

12. The method of claim 8 in which both said first and said second sets of transmission requirements include encryption.

13. The method of claim 8 comprising the additional steps, whenever the configuration of said network changes, of:

recalculating in said processor a route from said originating node to each of said destination nodes in which each link satisfies said first set of transmission requirements;
replacing routes stored in said memory with said recalculated routes; and
establishing the recalculated stored route from said originating node to said designated destination node if said second set of transmission requirements matches said first set of transmission requirements.

14. The method of claim 13 in which said recalculation takes place in said processor as a background operation, permitting other operations to be performed as foreground operations.

* * * * *